United States Patent
Yang

(10) Patent No.: US 11,121,579 B2
(45) Date of Patent: Sep. 14, 2021

(54) CIRCUIT FOR POWER SUPPLY AND ELECTRONIC DEVICE USING SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yong-Xing Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 189 days.

(21) Appl. No.: 16/405,336

(22) Filed: May 7, 2019

(65) Prior Publication Data

US 2020/0287406 A1    Sep. 10, 2020

(30) Foreign Application Priority Data

Mar. 5, 2019    (CN) .......................... 201910163760.7

(51) Int. Cl.
  *H02J 9/06*       (2006.01)
  *H02J 7/35*       (2006.01)
  *H05B 47/105*     (2020.01)

(52) U.S. Cl.
  CPC ................ *H02J 9/061* (2013.01); *H02J 7/35* (2013.01); *H05B 47/105* (2020.01)

(58) Field of Classification Search
  CPC .......... H02J 9/061; H02J 7/35; H05B 47/105; H05B 47/10

USPC ........ 307/23, 43, 66; 320/109, 116, 119, 124
See application file for complete search history.

(56) References Cited

U.S. PATENT DOCUMENTS

| | | | | | |
|---|---|---|---|---|---|
| 3,414,802 | A | * | 12/1968 | Harrigan ................... | G05F 1/59 363/89 |
| 3,509,357 | A | * | 4/1970 | Studtmann ........... | H03K 17/725 307/64 |
| 5,867,007 | A | * | 2/1999 | Kim ...................... | H01M 10/482 320/118 |
| 6,452,362 | B1 | * | 9/2002 | Choo .................... | H02J 7/0025 320/116 |
| 10,291,063 | B1 | * | 5/2019 | Feare ...................... | H04M 1/04 |

\* cited by examiner

*Primary Examiner* — Toan T Vu
(74) *Attorney, Agent, or Firm* — ScienBiziP, P.C.

(57) ABSTRACT

A power supply circuit supplying power to components of a fixed or mobile electrical or electronic device includes a main battery, an auxiliary battery, and main and auxiliary switch units. The main battery and the main switch unit form a main power supply circuit, and the auxiliary battery and the auxiliary switch unit form an auxiliary power supply circuit. The main switch unit includes a lighting unit controlling the switching on or off of the auxiliary switch unit. When the lighting unit is switched on, the auxiliary switch unit is switched off and the auxiliary power supply circuit is disabled. When the lighting unit is switched off, the auxiliary switch unit is switched on and the auxiliary power supply circuit is enabled. An electronic device including such a power supply circuit is also provided.

18 Claims, 2 Drawing Sheets

CIRCUIT FOR POWER SUPPLY AND ELECTRONIC DEVICE USING SAME

FIELD

The subject matter herein generally relates to power supplies.

BACKGROUND

Electronic devices such as mobile phones are commonly used. However, usage of electronic devices, especially those carried by users, is restricted by the capacity of batteries in the electronic devices.

Therefore, there is a need for an improved power supply.

BRIEF DESCRIPTION OF THE DRAWINGS

Implementations of the present technology will now be described, by way of embodiments, with reference to the attached figures.

DETAILED DESCRIPTION

The present disclosure is made in conjunction with the accompanying drawings. Specific embodiments of the present disclosure are described.

In the following description, when an element is described as being "fixed to" another element, the element can be fixed to the another element with or without intermediate elements. When an element is described as "connecting" or "connecting to" another element, the element can be connected to the other element with or without intermediate elements.

Without definition otherwise, all terms given below are of the same meaning as commonly understood by those skilled in the art. The term "and/or" means including any and all combinations of one or more of associated listed items.

Figure 1:
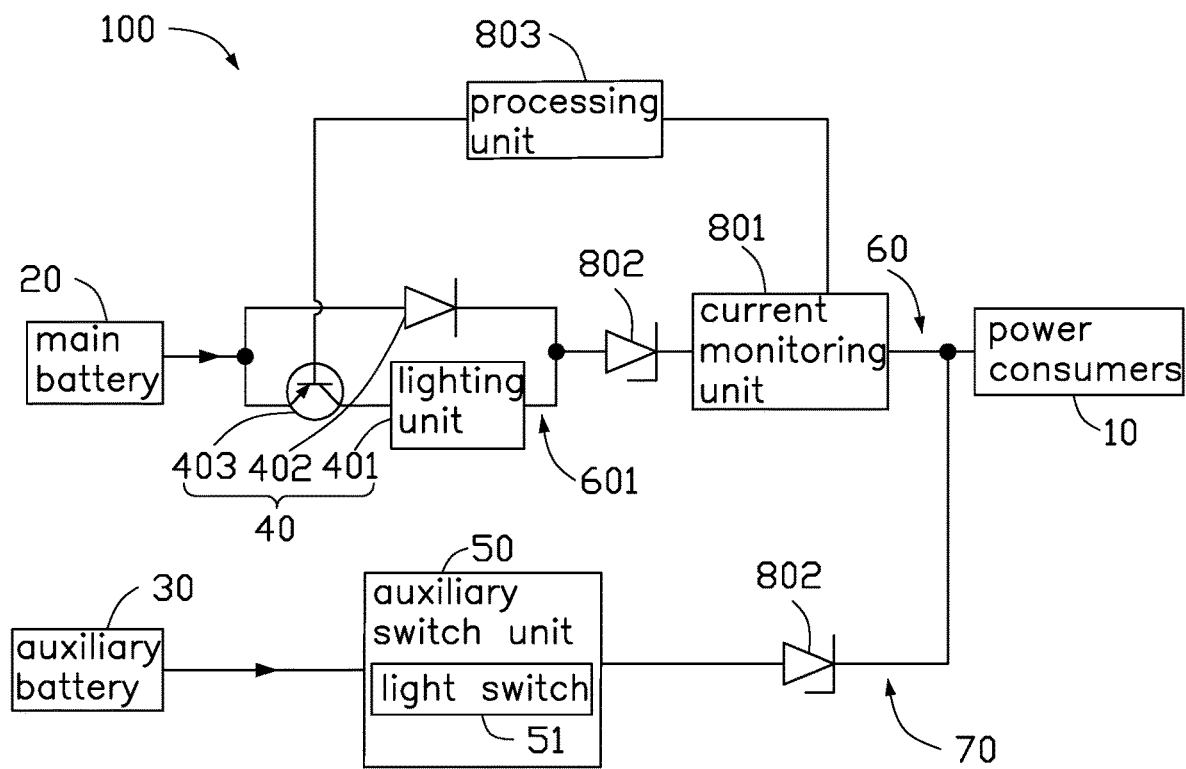
FIG. 1 is a schematic view of a power supply circuit according to an embodiment of the present disclosure.

Referring to FIG. 1, an embodiment of the present disclosure provides a power supply circuit 100. The power supply circuit 100 supplies power to one or more components of an electronic device 200 (see FIG. 2) which consume electrical power (hereinafter called "power consumers 10"). The power supply circuit 100 includes a main battery 20, an auxiliary battery 30, a main switch unit 40, and an auxiliary switch unit 50. The main battery 20 and the main switch unit 40 form a main power supply circuit 60 and the main battery 20 supplies power to the power consumers 10 via the main power supply circuit 60. The auxiliary battery 30 and the auxiliary switch unit 50 form an auxiliary power supply circuit 70 and the auxiliary battery 30 supplies power to the power consumers 10 via the auxiliary power supply circuit 70.

The power supply circuit 100 further includes a current monitoring unit 801 and two voltage stabilizing units 802. The current monitoring unit 801 monitors a value of the current flowing through the main power supply circuit 60. In the embodiment, the current monitoring unit 801 is disposed in the main power supply circuit 60 to sample the current flowing through the main power supply circuit 60 to obtain a value. One of the voltage stabilizing units 802 is disposed in the main power supply circuit 60 to stabilize the voltage level of the main power supply circuit 60. The other of the voltage stabilizing units 802 is disposed in the auxiliary power supply circuit 70 to stabilize the voltage level of the auxiliary power supply circuit 70.

The power supply circuit 100 is connected to a processing unit 803. In the embodiment, the processing unit 803 is connected both to the current monitoring unit 801 and the main switch unit 40 and switches the main switch unit 40 on or off according to the value of current obtained by the current monitoring unit 801.

The main switch unit 40 includes a lighting unit 401, a diode 402, and an electronic switch 403. The electronic switch 403 has a first terminal connected to the processing unit 803, a second terminal connected to the main battery 20, and a third terminal connected to the current monitoring unit 801, via the lighting unit 401. The electronic switch 403 and the lighting unit 401 are connected in series to form a branch 601. The diode 402 is connected in parallel to the branch 601. The lighting unit 401 is illuminated when the electronic switch 403 switches on to let current through the lighting unit 401, and is not illuminated when the electronic switch 403 is switched off. The diode 402 allows current to flow to the power consumers 10 from the main battery 20 while preventing any backflow, thus current cannot flow to the main battery 20 when the auxiliary battery 30 supplies power to the power consumers 10.

The auxiliary switch unit 50 includes a light switch 51. The light switch 51 is within a preset area of the light from the lighting unit 401. The light switch 51 is switched off when the lighting unit 401 is illuminated and switched on when the lighting unit 401 is not illuminated. Switching off the light switch 51 results in the auxiliary switch unit 50 being switched off and the auxiliary battery 30 is blocked from supplying power to the power consumers 10. Switching on the light switch 51 results in the auxiliary switch unit 50 being switched on and the auxiliary battery 30 being connected to the power consumers 10. Thus, when the main battery 20 fails to power the power consumers 10, no power is supplied to the lighting unit 401 and the lighting unit 401 goes dark (e.g., is not illuminated). Turning dark of the lighting unit 401 results in switching on the auxiliary switch unit 50 and the auxiliary battery 30 supplying power to the power consumers 10.

In the embodiment, at the moment the electronic device 200 is powered on, the main power supply circuit 60 and the auxiliary power supply circuit 70 are both switched on. However, when the main power supply circuit 60 is switched on, the lighting unit 401 is powered and is illuminated. The illuminated lighting unit 401 affects the auxiliary switch unit 50 by switching it off. As a result, the auxiliary battery 30 is blocked and only the main battery 20 supplies power to the power consumers 10. The current monitoring unit 801 monitors a value of the current flowing in the main power supply circuit 60 and provides the value of current to the processing unit 803. The processing unit 803 compares the current value with a first threshold value and prompts the user to consider enabling the auxiliary battery 30 when the current value falls below the first threshold value. In the embodiment, the first threshold value indicates an almost-empty state of the main battery 20. When the users respond by enabling the auxiliary battery 30, the processing unit 803 switches off the electronic switch 403. The lighting unit 401 goes dark and the auxiliary switch unit 50 switches on accordingly. As a result, the auxiliary battery 30 is enabled and powers the power consumers 10. In another embodiment, the processing unit 803 switches off the electronic switch 403 to enable the auxiliary battery 30 when the value of current falls below the first threshold value, without consulting the user.

When the main battery 20 is recharged or has been updated with a fresh battery, the value of the current flowing in the main power supply circuit GO is monitored by the current monitoring unit 801 and such value is provided to the processing unit 803. The processing unit 803 compares the value of the current with a second threshold value and prompts the users whether to disable the auxiliary battery 30 when the value of the current exceeds the second threshold value. In the embodiment, the second threshold value is greater than or equal to the first threshold value, the value of the current exceeding the second threshold value indicates that the main battery 20 has plenty of power to power the power consumers 10. When the users respond by disabling the auxiliary battery 30, the processing unit 803 switches on the electronic switch 403. The lighting unit 401 becomes bright and the auxiliary switch unit 50 is switched off accordingly. As a result, the auxiliary battery 30 is blocked from the power consumers 10. In another embodiment, the processing unit 803 switches on the electronic switch 403 to disable the auxiliary battery 30 when the value of the current goes beyond the second threshold value, without consulting the user.

In another embodiment, the processing unit 803 may controls the main switch unit 40 and/or the auxiliary switch unit 50 by other ways, for example, the processing unit 803 may controls the main switch unit 40 and/or the auxiliary switch unit 50 through logic gate circuits.

Figure 2:
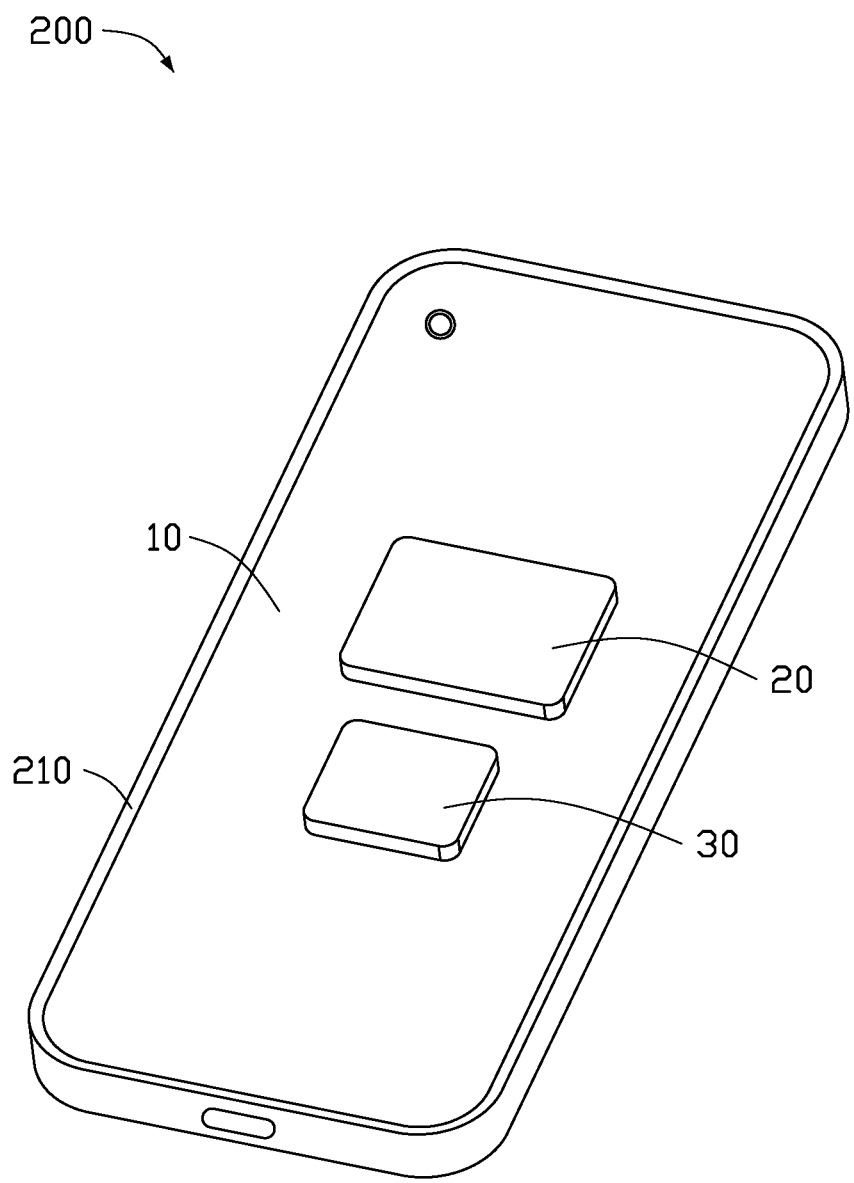
FIG. 2 is an isometric view of an electronic device using the circuit of FIG. 1 according to an embodiment of the present disclosure.

Referring to FIG. 2, an electronic device 200 is shown. The electronic device 200 can be a mobile phone, a camera, a tablet PC, or the like. In the embodiment, the electronic device 200 is a mobile phone. The electronic device 200 includes the power supply circuit 100 and power consumers 10 including the processing unit 803. The main battery 20 and the auxiliary battery 30 are disposed in a main body 210 of the electronic device 200 and controlled by the processing unit 803 to supply power to the power consumers 10.

In the embodiment, the auxiliary battery 30 is a solar panel which converts light energy into electrical power and stores the electrical power. The auxiliary battery 30 can be recharged by absorbing electrical energy from light beams. The auxiliary battery 30 can further be recharged by electrical power provided by other devices such as a charger. When the main battery 20 is drained, the auxiliary battery 30 can be enabled by the processing unit 803 to power the power consumers 10.

In the embodiment, the auxiliary battery 30 is detachably disposed on the main body 210 of the electronic device 200. The auxiliary battery 30 can be assembled to the main body 210 to power the power consumers 10 and be disassembled at any time from the main body 210.

In the embodiment, the processing unit 803 can enable or disable a plurality of functions of the electronic device 200 according to whether the auxiliary battery 30 is enabled or disabled. The processing unit 803 enables a plurality of functions of the electronic device 200 when the auxiliary battery 30 is disabled, and disables a plurality of functions of the electronic device 200 when the auxiliary battery 30 is enabled. For example, when the auxiliary battery 30 is disabled and the main battery 30 powers the power consumers 10, the processing unit 803 enables all functions of the electronic device 200. When the auxiliary battery 30 is enabled, the processing unit 803 enables some of the functions of the electronic device 200 while disabling other functions of the electronic device 200. For example, the processing unit 803 may enable dialing a call and sending short messages but other applications may be disabled. A list of enabled and disabled functions can be predefined by the user and stored in the electronic device 200.

The electronic device of the present disclosure can be powered by an auxiliary battery when the main battery is drained and not recharged in time, which extends the use of the electronic device. The auxiliary battery is enabled and is disabled according to the switching off or on of a main switch unit in a main power supply circuit, the switching off or on of the main switch unit being in accordance with a value of current flowing in the main power supply circuit, the operation of enabling or disabling the auxiliary battery is simple and reliable.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. A power supply circuit supplying power to an electronic device, comprises a main battery, an auxiliary battery, a main switch unit and an auxiliary switch unit, the main battery and the main switch unit form a main power supply circuit to power the electronic device, the auxiliary battery and the auxiliary switch unit form an auxiliary power supply circuit to power the electronic device, the main switch unit comprises a lighting unit, wherein when the main switch is switched on, a current from the main battery to the electronic device is applied to the lighting unit, and the lighting unit is illuminated, the auxiliary switch unit is switched off if the light unit is emitting light and the auxiliary power supply circuit is disabled from powering the electronic device, when the lighting unit is not emitting light, the auxiliary switch unit is switched on and the auxiliary power supply circuit is enabled to power the electronic device.

2. The power supply circuit as claimed in claim 1, wherein the main switch unit comprises a current monitoring unit and an electronic switch, the electronic switch is connected with the lighting unit in series to form a branch, the current monitoring unit monitors a value of current flowing through the main switch unit; the processing unit controls the electronic switch on or off according to the value of the current, the switching on of the electronic switch switches on the lighting unit to illuminate, and the switching off of the electronic switch switches off the lighting unit.

3. The power supply circuit as claimed in claim 2, wherein when the current value falls below a first threshold value, the processing unit controls the electronic switch to be switched off, the lighting unit is switched off and the auxiliary switch unit is switched on, thereby the auxiliary power supply circuit is enabled to power the electronic device.

4. The power supply circuit as claimed in claim 3, wherein when the current value goes beyond a second threshold value, the processing unit controls the electronic switch to be switched on, the lighting unit is illuminated according to the current from the main battery to the electronic device, and the auxiliary switch unit is switched off if the light unit is emitting light, thereby the auxiliary power supply circuit is disabled from powering the electronic device, the second threshold value is greater than or equal to the first threshold value.

5. The power supply circuit as claimed in claim 4, wherein electronic switch is controlled by a processing unit of the electronic device which compares the current value with the first threshold value and the second threshold value.

6. The power supply circuit as claimed in claim 2, wherein the main switch unit comprises a diode, the diode is connected in parallel to the branch, the main battery supply electronic power to the electronic device via the diode, a current path for backflow currents are defined from the diode to the main battery.

7. The power supply circuit as claimed in claim 1, wherein the auxiliary switch unit comprises a light switch controlled by light from the lighting unit, the light switch switches off when the lighting unit is illuminated based on the current from the main battery to the electronic device, and the light switch switches on when the lighting unit is not emitting light, thereby the auxiliary switch unit switches off or on accordingly.

8. The power supply circuit as claimed in claim 1, wherein the auxiliary battery is a solar panel which converts light energy into electrical power being stored into the auxiliary battery.

9. The power supply circuit as claimed in claim 1, wherein the main power supply circuit comprises a voltage stabilizing unit for stabilizing a voltage level of the main power supply circuit.

10. The power supply circuit as claimed in claim 1, wherein the auxiliary power supply circuit comprises a voltage stabilizing unit for stabilizing a voltage level of the auxiliary power supply circuit.

11. An electronic device comprising electronic device and a power supply circuit supplying power to the electronic device, the power supply circuit comprises a main battery, an auxiliary battery, a main switch unit and an auxiliary switch unit, the main battery and the main switch unit form a main power supply circuit to power the electronic device, the auxiliary battery and the auxiliary switch unit form an auxiliary power supply circuit to power the electronic device, the main switch unit comprises a lighting unit, wherein when the main switch is switched on, a current from the main battery to the electronic device is applied to the lighting unit, and the lighting unit is illuminated, the auxiliary switch unit is switched off if the light unit is emitting light and the auxiliary power supply circuit is disabled from powering the electronic device, when the lighting unit is not emitting light, the auxiliary switch unit is switched on and the auxiliary power supply circuit is enabled to power the electronic device.

12. The electronic device as claimed in claim 11, wherein the main switch unit comprises a current monitoring unit and an electronic switch, the electronic switch is connected with the lighting unit in series to form a branch, the current monitoring unit monitors a value of current flowing through the main switch unit; the processing unit controls the electronic switch on or off according to the value of the current, the switching on of the electronic switch turns on the lighting unit to illuminate, and the switching off of the electronic switch turns off the lighting unit.

13. The electronic device as claimed in claim 12, wherein the electronic device comprises a processing unit, the processing unit receives the value of current from the current monitoring unit and compares the value of current with a first threshold value and a second threshold value greater than or equal to the first threshold value, the processing unit switches off the electronic switch when the value of current falls below the first threshold value and switches on the electronic switch when the value of current goes beyond the second threshold value.

14. The electronic device as claimed in claim 11, wherein the main switch unit comprises a diode, the diode is connected in parallel to the branch, the diode allows the main battery supply electronic power to the electronic device via the diode, a current path for backflow currents are defined from the diode to the main battery.

15. The electronic device as claimed in claim 11, wherein the auxiliary switch unit comprises a light switch controlled by light from the lighting unit, the light switch switches off when the lighting unit is illuminated according to the current from the main battery to the electronic device, and switches on when the lighting unit is if the light unit is not emitting light, thereby the auxiliary switch unit switches off or on accordingly.

16. The electronic device as claimed in claim 11, wherein the auxiliary battery is detachably amounted in the electronic device.

17. The electronic device as claimed in claim 11, wherein the auxiliary battery is a solar panel which converts light energy into electrical power being stored into the auxiliary battery.

18. The electronic device as claimed in claim 11, wherein all functions of the electronic device is enabled when the auxiliary power supply circuit is disabled from powering the electronic device, and partly of the functions of the electronic device is enabled when the auxiliary power supply circuit is enabled to power the electronic device.

\* \* \* \* \*